United States Patent
Keogh et al.

(10) Patent No.: US 10,958,176 B2
(45) Date of Patent: Mar. 23, 2021

(54) SYSTEMS AND METHODS OF CCM PRIMARY-SIDE REGULATION

(71) Applicant: Texas Instruments Incorporated, Dallas, TX (US)

(72) Inventors: Andrew Bernard Keogh, Cork (IE); Joseph Michael Leisten, Cork (IE); William James Long, Cork (IE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1115 days.

(21) Appl. No.: 14/494,982

(22) Filed: Sep. 24, 2014

(65) Prior Publication Data

US 2015/0103566 A1 Apr. 16, 2015

Related U.S. Application Data

(60) Provisional application No. 61/890,638, filed on Oct. 14, 2013.

(51) Int. Cl.
*H02M 3/335* (2006.01)
*H02M 1/00* (2006.01)

(52) U.S. Cl.
CPC .... *H02M 3/33507* (2013.01); *H02M 3/33523* (2013.01); *H02M 2001/0003* (2013.01); *H02M 2001/0006* (2013.01); *H02M 2001/0025* (2013.01)

(58) Field of Classification Search
CPC ............. H02M 3/335; H02M 3/33507; H02M 3/33523; H02M 2001/0003; H02M 2001/0006; H02M 2001/0025

USPC ........................................... 363/21.12–21.18
See application file for complete search history.

(56) References Cited

U.S. PATENT DOCUMENTS

| | | | |
|---|---|---|---|
| 5,438,499 A | 8/1995 | Bonte et al. | |
| 8,018,741 B2* | 9/2011 | Huynh | H02M 3/33523 363/21.01 |
| 9,871,451 B2* | 1/2018 | Lin | H02M 3/33507 |
| 2004/0047166 A1* | 3/2004 | Lopez-Santillana | H02M 1/4225 363/89 |
| 2004/0052095 A1* | 3/2004 | Muegge | H02M 3/156 363/21.12 |
| 2006/0083032 A1* | 4/2006 | McDonald | H02M 3/33592 363/21.12 |
| 2006/0284567 A1* | 12/2006 | Huynh | H02M 3/33507 315/246 |

(Continued)

*Primary Examiner* — Thienvu V Tran
*Assistant Examiner* — Ivan Laboy
(74) *Attorney, Agent, or Firm* — Mark Allen Valetti; Charles A. Brill; Frank D. Cimino

(57) ABSTRACT

Example embodiments of the systems and methods of CCM primary-side regulation disclosed herein subtract an estimate of the secondary IR drop from each output voltage sample. This allows a fixed sample instant to be set (with regard to the beginning of the off or flyback interval), and removes the need to hunt for or adjust to an optimum sample instant, or one with minimum IR drop error. The estimate of the IR drop may be adjusted on a cycle-by-cycle basis, based on the commanded primary peak current, knowing that the peak secondary current will be directly proportional by the turns ratio of the transformer. For improved accuracy, an adjustment may be made for the decay of secondary current during the delay to the sample instant, if the inductance value is known.

20 Claims, 6 Drawing Sheets

(56) References Cited

U.S. PATENT DOCUMENTS

| | | | | |
|---|---|---|---|---|
| 2007/0274106 A1* | 11/2007 | Coulson | ............ | H02M 3/33523 363/21.12 |
| 2008/0094047 A1* | 4/2008 | Huynh | .............. | H02M 3/33523 323/282 |
| 2010/0054000 A1* | 3/2010 | Huynh | .............. | H02M 3/33507 363/21.16 |
| 2013/0077354 A1* | 3/2013 | Behagel | ............ | H02M 3/33523 363/21.01 |
| 2014/0078790 A1* | 3/2014 | Lin | ................... | H02M 3/33507 363/21.16 |

\* cited by examiner

SYSTEMS AND METHODS OF CCM PRIMARY-SIDE REGULATION

CROSS-REFERENCE TO RELATED APPLICATION

This application claims benefit to U.S. provisional patent application Ser. No. 61/890,638, filed on Oct. 14, 2013, which is incorporated by reference herein.

TECHNICAL FIELD

The present disclosure is generally related to power supplies and, more particularly, is related to flyback switching power supplies.

BACKGROUND

Basic flyback converter 100 shown in FIG. 1 comprises transformer 140 with, typically, at least three windings—primary winding 150, secondary winding 160, and bias winding 170, with winding polarities as shown by the dot notation. Flyback converter 100 operates by turning on main primary switch 145, thereby applying the input voltage from storage capacitor 135 across primary winding 150, for a period of time (hereafter called "on-time" 410 of FIG. 4). Primary switch 145 may be MOSFET, bipolar, SiC, GaN, or any other suitable transistor technology. The input voltage will appear across both secondary winding 160 and bias winding 170 during this interval, scaled by the turns ratios, but with a negative polarity due to the winding polarities. This negative voltage on secondary winding 160 and bias winding 170 keeps diode rectifiers 133 and 132 on those windings reverse-biased and thus off.

When primary switch 145 is turned off, the current in primary winding 150 will have reached a certain peak level $I_{pri(peak)}$, depending on the transformer inductance, the on-time and the input voltage. This current will continue to flow in the primary inductance, and will charge the total capacitance on the primary switch (the capacitance of the switch itself, particularly if a MOSFET is used, and output capacitance reflected back through the transformer shown as capacitance 146). The switch voltage will rise until the scaled reflected secondary voltage becomes sufficiently positive that secondary diode rectifier 132 becomes forward-biased and turns on. At this point, the current that was flowing in the primary will transfer to secondary winding 160, transferring the energy that was stored during the on-time into output capacitor 180 and the output load. The secondary current will decay over time at a rate proportional to the secondary-reflected inductance and the output voltage.

Referring to FIGS. 2A, 2B, and 2C, signals 212, 222, and 232 represent the primary current and signals 216, 226, and 232 represent the secondary current. In the on-time, the current in the primary winding of the flyback transformer builds. Then, when the current reaches the peak demand, the cycle is terminated, the current stops flowing in the MOSFET and transfers to the secondary winding, where the current continues to flow in the secondary side of the circuit. The secondary current has a down slope because the voltage across it is negative. The ratio of the peak current on the primary to the peak current on the secondary is controlled by the turns ratio between the primary and the secondary. As shown in FIG. 2A, when the secondary current decays to zero and there is some off-time interval, this is normally referred to as discontinuous conduction mode (DCM) because the secondary current is allowed to decay to zero for some time before the next cycle.

Very often, as shown in FIG. 2B, the turn-on of the primary switch is delayed slightly and timed to coincide with the trough of the resonant ringing on the switch node, to minimize switching losses—this mode is known as QR (Quasi-resonant mode). As shown in FIG. 2C, if the primary switch is turned on before the secondary rectifier current has decayed fully to zero, then there is no off-time interval where the switch voltage resonates, and this mode is called CCM (continuous conduction mode). Operation at the boundary of these modes is referred to as BCM or TM (Boundary Conduction mode or Transition Mode). The point at which the secondary current decays to zero, when the secondary diode rectifier becomes reverse-biased, is often referred to as the "knee-point"—since there will be a sharp change in slope, or a knee, in the sensed bias winding waveform at this point.

The flyback interval is the period in which the primary energy is transferred to the secondary. When primary switch 145 is ON, the primary current builds up as shown in FIG. 3A. When the primary switch is OFF, the primary current charges output capacitor 180 as shown in FIG. 3B. As shown in FIG. 3C, the stored energy flows into output cap 180 when the output diode is forward biased. During the interval shown in FIG. 3C, primary switch 145 is OFF and the voltage across switch capacitor 146 has increased to a level greater than Vin, sufficient that the reflected voltage on the secondary is enough to forward bias the diode. The voltage on the secondary winding is then clamped to the secondary voltage and the voltage on primary switch capacitor 146 is the reflected voltage added to the input voltage. In discontinuous conduction mode (DCM), the secondary current decays to zero and the primary capacitance resonates with magnetizing inductance, per FIG. 3D. So at the instant the current in the secondary winding drops to zero and the diode becomes reversed biased, capacitor 146 is now charged at a voltage greater than the input voltage level. The overcharged switch capacitor resonates with the transformer magnetic inductance producing an LC resonant ring. Capacitor 146 will then resonate with transformer primary magnetizing inductance, and the capacitor continues to discharge below Vin to an amount equal to the level it was above the input voltage, thereby storing energy in the inductor which will flow back into the capacitor producing the resonant ringing. If there is no damping of the circuit, the ring will occur at the same level indefinitely. But, because there is loss and damping, the ring dies out over time.

Many flyback converters use secondary side regulation with an error amplifier on the secondary side of the transformer and an optocoupler to send output voltage/current information back to the primary side of the transformer. The secondary side circuit transfers the secondary side error signal to the primary side for the feedback loop to modulate the duty cycle. Primary side regulation (PSR) regulates the output current and secondary voltage applied on the load through control within the primary side, eliminating the need for secondary-side feedback, saving cost.

Specifically, the PSR circuit directly uses the voltage signal that it receives from an auxiliary winding on the primary side of the transformer to modulate the pulse duty-cycle and/or frequency, so as to regulate the output current or voltage applied on the load. Traditional PSR controls the feedback signal by detecting the voltage of an auxiliary transformer winding. In this implementation, the constant voltage is achieved by comparing the detected feedback voltage with a reference voltage on the controller that is proportional to the target output voltage. There are heretofore unaddressed needs with previous high power circuits using flyback topologies with primary side regulation.

SUMMARY

Example embodiments of the present disclosure provide systems of CCM primary-side regulation. Briefly described, in architecture, one example embodiment of the system, among others, can be implemented as follows: a voltage converter comprising a flyback transformer with at least a primary winding, a secondary winding, and a dedicated bias/sense winding; a primary side switch; and a flyback controller configured to sample an output voltage at a fixed time during a secondary flyback decay period and modulate the primary switch based on an adjustment to the sampled output voltage.

Embodiments of the present disclosure can also be viewed as providing methods for CCM primary-side regulation. In this regard, one embodiment of such a method, among others, can be broadly summarized by the following steps: sensing an output voltage of a flyback voltage converter; adjusting a reference based on a predicted error in the sensed output voltage; and modulating at least one of a switching frequency and a peak current based on power demand

BRIEF DESCRIPTION OF THE DRAWINGS

FIG. 3A is a circuit diagram showing primary current flow with primary switch on.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 3A:
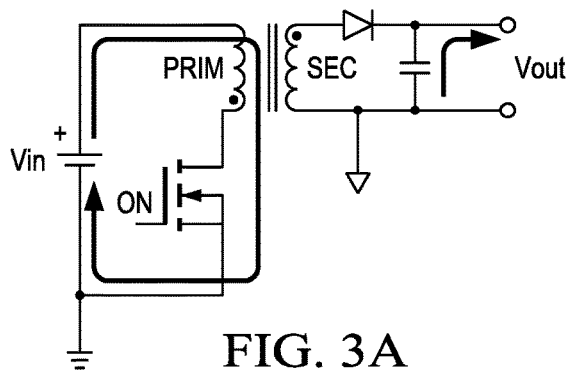
Figure 3B:
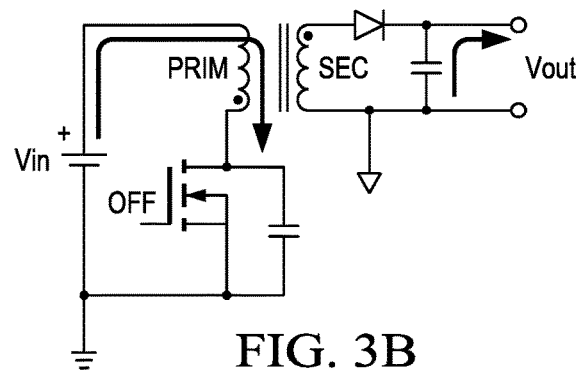
FIG. 3B is a circuit diagram showing primary current flow with primary switch off.
Figure 3C:
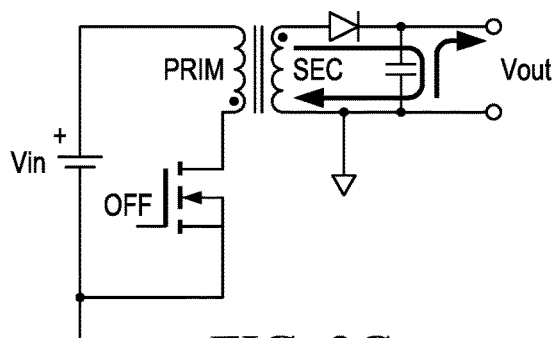
FIG. 3C is a circuit diagram showing secondary current flow with primary switch off.
Figure 3D:
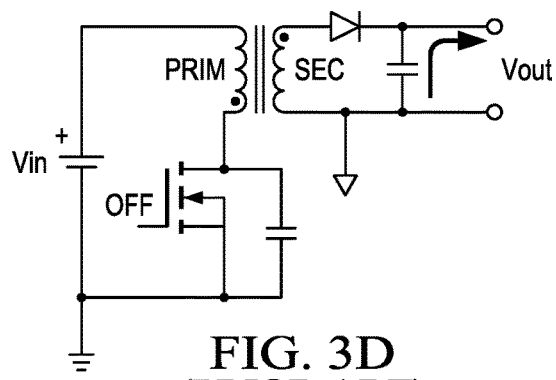
FIG. 3D is a circuit diagram showing secondary current flow with secondary rectifier reverse biased and primary switch off.
Figure 4:
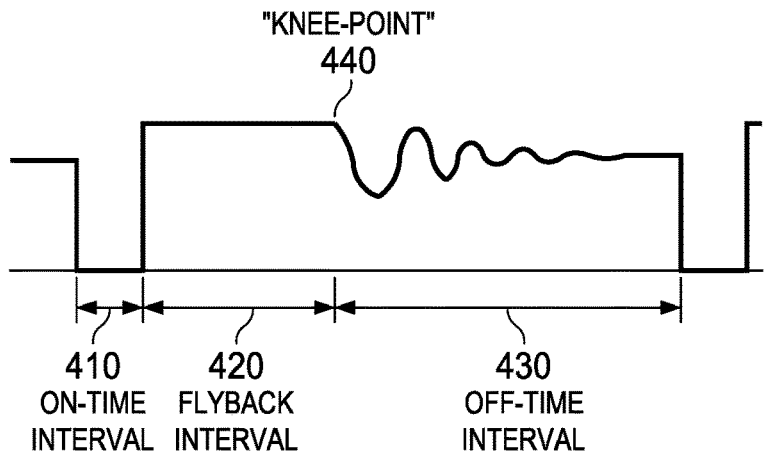
FIG. 4 is a signal diagram of a flyback switch node waveform showing a knee point.

The sensed output voltage is only available on the bias winding during a specific time-window when secondary current is flowing. The bias winding voltage may be fed to a sample and hold circuit, with the sampling timed to occur during the flyback interval. Thus the switched bias winding waveform can be converted to a continuous analog level that can then be used as the input to a voltage control loop error amplifier. As noted previously, there is an offset error in the sensed bias winding voltage due to the output rectifier forward voltage drop. If known, this can be compensated for by adjusting the reference level in the voltage regulation loop, i.e. by introducing a compensating offset to the reference. During flyback-interval 420 of FIG. 4, the voltage across the secondary winding is clamped to the output voltage by the rectifying diode as shown in FIG. 3C. Thus the secondary winding voltage will be approximately (Vout+Vrect) where Vrect is the rectifier forward on-state drop. This same voltage will be scaled and reflected to all other transformer windings. Once the secondary current decays to zero, the secondary diode rectifier will become reverse-biased and turn off. During final off-time interval 430, the energy in the transformer magnetizing inductance resonates and rings with the total switch-node capacitance, until the main primary switch is turned back on and the sequence repeats.

Figure 5:
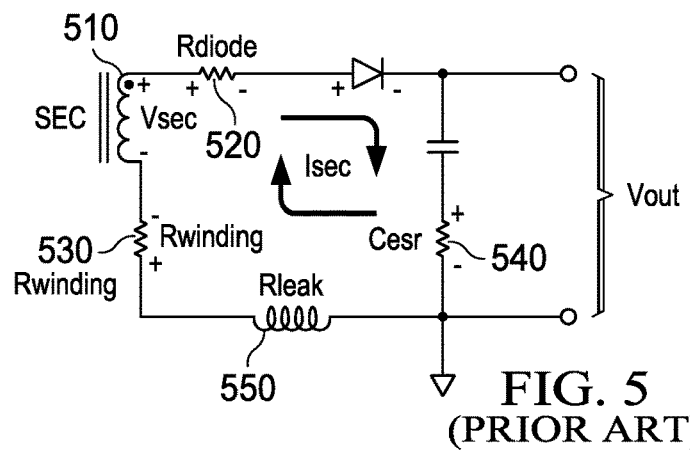
FIG. 5 is a circuit diagram of secondary side of a flyback converter showing the error-inducing voltage drops.

However, as shown in FIG. 5, the secondary terminal voltage on winding 510 contains other error sources besides the on-state drop of rectifier 132. Transformer secondary winding 510 has resistance 530, the output capacitor has non-zero equivalent series resistance (esr) 540, the output rectifier (assuming a diode is used) has an effective resistance 520 (which gives the non-ideal slope that deviates from a perfect zero-resistance curve of the ideal diode), and the transformer has leakage inductance 550. While the secondary current is still flowing in all these elements, there will be an additional voltage drop that will appear at the secondary terminals, adding to the sensed output voltage. If the bias winding is sampled while the secondary current is still flowing, there will be a sensing error due to these voltage drops. If the bias winding is sampled after the current has decayed to zero, there will be a gross sensing error, since the winding voltage is no longer related to Vout at all. The voltage drop due to the resistive elements will be positive (I×R) and will add to the terminal voltage. However, the voltage drop due to the leakage inductance will be proportional to the rate of decay of output current (for an inductor, V=Ldi/dt), and will therefore be negative since current is decaying (di/dt is negative). So this subtracts from the net secondary terminal voltage.

To support operation in CCM and allow operation at fixed frequency over a large percentage of the load range, example embodiments of the systems and methods of CCM primary-side regulation disclosed herein use fixed point sampling rather than knee-point detection. When conventionally used, fixed-point sampling typically suffers from poorer regulation performance. This poor performance results from the voltage drops across the secondary-side parasitic resistance $R_{SEC}$ (the total resistance from $R_{diode}$ 520, $R_{winding}$ 530), and $R_{cesr}$ 540 and the secondary-side leakage inductance from the secondary side to bias $L_{LK(sec\_bias)}$ 550. This is a consequence of the current still flowing on the secondary-side when the output voltage is measured. The secondary-side terminal voltage that gets reflected to the bias winding may be expressed as:

$$V_{SEC} = V_{OUT} + V_{RECT} + V_{R(sec)} - V_{L(leak)} + V_{RC(esr)}$$

which can be expanded and rearranged into:

$$V_{SEC} = V_{OUT} \times \left(1 - \frac{L_{LK(sec\ bias)}}{L_{SEC}}\right) + V_{RECT} + I_{SEC} \times (R_{SEC} + R_{C(esr)}) - (I_{LOAD} \times R_{C(esr)})$$

Many elements contribute errors to the sensed secondary-side terminal voltage, when measured across the bias winding, including $V_{L(leak)}$, $V_{RECT}$, $V_{R(sec)}$, and $V_{RC(esr)}$.

$V_{L(leak)}$ is the negative voltage drop across the sec-bias leakage inductance $L_{LK(sec\ bias)}$. Assuming constant regulated output voltage, this voltage drop is a fixed constant offset because $V_{OUT}/L_{SEC}$ is constant as long as the output is in regulation.

$V_{RECT}$ is the positive voltage drop across the output rectifier (assuming use of a conventional diode). This voltage drop varies with load current and temperature. However, a constant nominal voltage drop can usually be used, because the increasing forward voltage drop with increasing load current is largely cancelled by the decrease in forward drop as a result of the temperature rise that follows.

$V_{R(sec)}$ is the drop across the secondary-side winding resistance. This value depends on loading, and varies in proportion to the primary peak current demand that is set by the modulator. $V_{RC(esr)}$ is the drop across the output capacitor equivalent series resistance (esr). This value depends on the difference between the secondary-side winding current and the DC load current being drawn.

Typically, the peak secondary-side winding current $I_{SEC}$ is many times larger than the load current, and the secondary-side winding resistance is typically larger than the output capacitor esr. Thus, the last term in the equation involving $I_{LOAD}$ can usually be neglected. The leakage inductance and secondary-side rectifier terms represent quasi-constant offset terms, so do not affect regulation to a significant extent. Thus the quasi-constant offset terms can be accounted for in the calculation of the required scaling resistors to produce the desired setpoint voltage.

The remaining term that dominates the regulation error is the drop across the secondary-side winding resistance and capacitor esr at the sample instant, $\{I_{SEC} \times (R_{SEC} + R_{C(esr)})\}$. The systems and methods disclosed herein internally adjusts the control loop reference in proportion to the primary peak current demand in order to null the $I_{SEC}$ related error term in the sampled bias winding voltage. Since the peak secondary-side current $I_{SEC(pk)}$ is the primary peak current $I_{PRI(pk)}$ scaled by the transformer turns ratio, the internal control loop reference effectively varies in approximate proportion to $I_{SEC}$, resulting in dramatically improved regulation performance. This improved regulation performance allows the use of primary-side regulation in a wider range of applications, and at unprecedented power levels, operating in both CCM and DCM.

With the secondary current flowing around the loop in FIG. 5, there's a resistive drop in the diode, a resistive drop in the winding, and a leakage inductance drop. When the leakage inductance and peak current through the secondary winding based on the peak current demand is taken into account, an error may be estimated. In an example embodiment, that estimated error is added to the reference to get an adjusted reference. Then the output sample is subtracted from the adjusted reference to produce the error signal for the control loop. In an alternative embodiment, the reference voltage is constant and the estimated error is subtracted from the sampled voltage with, essentially, the same net effect.

Many magnetic sense schemes deploy knee-point detection in which the sensing scheme automatically finds the knee of the waveform, where the secondary current has decayed to zero. This technique effectively minimizes the error due to secondary resistance by seeking out the optimum sample point where the current has just reached zero. This timing information can also then be used to implement quasi-resonant switching. However, since these schemes inherently force operation to be always in BCM or DCM, they cannot run in CCM at all. Furthermore, if the operation is BCM, the switching frequency will vary with both line and load levels, and they cannot operate at fixed frequency at all. And since the BCM/QR mode of operation will force the frequency to decrease as load increases and/or as line decreases, the required transformer size will increase with power level. For these reasons, the QR/BCM knee-point approach, whilst widely deployed, may be limited at higher power levels.

The advantages of the example embodiments of systems and methods of CCM primary-side regulation disclosed herein allow magnetic sensing to operate at much higher power levels. Example embodiments allow operation in CCM, so that the transformer size does not need to be excessive. Example embodiments can operate in regions of fixed frequency (with frequency decrease at lighter loads to improve efficiency), or can operate entirely at fixed frequency if the application requires (and does not need the light load efficiency improvement). Fixed frequency operation is advantageous in some applications, where particular frequencies may be desired to be avoided (audio, touchscreen, telecoms, etc).

Example embodiments of the systems and methods of CCM primary-side regulation disclosed herein subtract an estimate of the secondary parasitic voltage drop from each sample. This allows a fixed sample instant to be set (with regard to the beginning of the flyback interval), and removes the need to hunt for or adjust to an optimum sample instant, or one with minimum parasitic voltage drop error. The estimate of the voltage drop may be adjusted on a cycle-by-cycle basis, based on the commanded primary peak current, knowing that the peak secondary current will be directly proportional by the turns ratio of the transformer. For improved accuracy, an adjustment may be made for the decay of secondary current during the delay to the sample instant, if the inductance value is known.

Alternatively, if a nominal or typical inductance value is assumed, and if the sample delay is relatively short, then the error due to assumed inductance will be small. In this way, the output sample is effectively extrapolated to the point where the secondary current would decay to zero. This means that the scheme will work equally well in both DCM and CCM, with the same fixed output sample instant. And for a reasonable range of transformer inductance values, the estimate of secondary resistance drop will improve the sensing accuracy while only taking a single voltage sample on the bias or sense winding.

In a sample implementation an 8-bit microcontroller core is used with configurable analogue & digital external peripherals as an example embodiment. The internal implementation of the scheme in the 8-bit CPU uses the following equations:

$$V_{sno_{err}}(lsbs) =$$

$$I_{pk_{dac}}(lsbs) * \left[ \frac{DACREF}{DACSCL} * \frac{1}{R_{cs}} * \frac{Np}{Ns} \right] * \left[ R_{sec} * \frac{Nb}{Ns} * \left( \frac{R_b}{R_t + R_b} \right) * \frac{1}{G_{mag}} * \frac{ADCSCL}{ADCREF} \right] - \left[ \frac{(V_o + V_{rect}) * N_p^2 * t_{out\_smp}}{L_{pri} * N_s^2} \right] *$$

$$\left[ R_{sec} * \frac{Nb}{Ns} * \frac{R_b}{(R_t + R_b)} * \frac{1}{G_{mag}} * \frac{ADCSCL}{ADCREF} \right]$$

This equation can be simplified to:

$$V_{sno\_err}(lsbs) = I_{pk\_dac}(lsbs) * K1 - K2,$$

where $$K1 = \left[ \frac{DACREF}{DACSCL} * \frac{1}{R_{cs}} * \frac{Np}{Ns} \right] *$$

$$\left[ R_{sec} * \frac{Nb}{Ns} * \left( \frac{R_b}{R_t + R_b} \right) * \frac{1}{G_{mag}} * \frac{ADCSCL}{ADCREF} \right]$$

and $$K2 = \left[ \frac{(V_o + V_{rect}) * N_p^2 * t_{out\_smp}}{L_{pri} * N_s^2} \right] *$$

$$\left[ R_{sec} * \frac{Nb}{Ns} * \frac{R_b}{(R_t + R_b)} * \frac{1}{G_{mag}} * \frac{ADCSCL}{ADCREF} \right]$$

In these equations, DACREF, DACSCL, ADCREF, ADCSCL, Gmag & tout_smp are internal IC parameters/gains, and the other terms refer to the values of the power supply system. Rsec refers to the secondary effective series resistance. Rcs refers to the current sense shunt resistance. Lpri refers to the transformer primary-referenced magnetizing inductance. Np refers to the transformer primary winding turns. Ns refers to the transformer secondary winding turns. Nb refers to the transformer bias winding turns. Rb, Rt refer to the resistor divider network on the IC VSENSE pin to scale the winding voltage down to the level required by the IC. Vo refers to the power supply system output voltage. And Vrect refers to the power supply system secondary rectifier on-state voltage drop.

In example embodiments, the secondary resistance can be estimated in the actual system by the controller, while operating. It does not necessarily have to be pre-determined or pre-computed, though it can be. The resistance may be estimated by adjusting the commanded peak primary current from a low level to a higher level for one switching cycle. In one switching cycle, only a small portion of the extra energy from the peak current increase can have transferred to the output capacitor by the time of the sample instant. So the measured apparent Vout increase will be proportional to both the delta in peak current and the secondary resistance. Since the delta in peak current is commanded under control of the power supply controller IC, the secondary resistance can be observed and thus learned by the delta in successive output voltage samples.

The example embodiments of the systems and methods of CCM primary-side regulation allow the control circuit to operate at much wider power ranges. They also allow seamless transition between CCM and DCM. Instead of using a knee-point detector, in order to stay in continuous mode, a sample is taken at a fixed time in the flyback interval—the T_out_sample point. As long as the transformer is designed such that the flyback interval is always longer than the sample point, then the sample is always available at that point even if the flyback interval changes with operating conditions, such as line and load changes.

Figure 1:
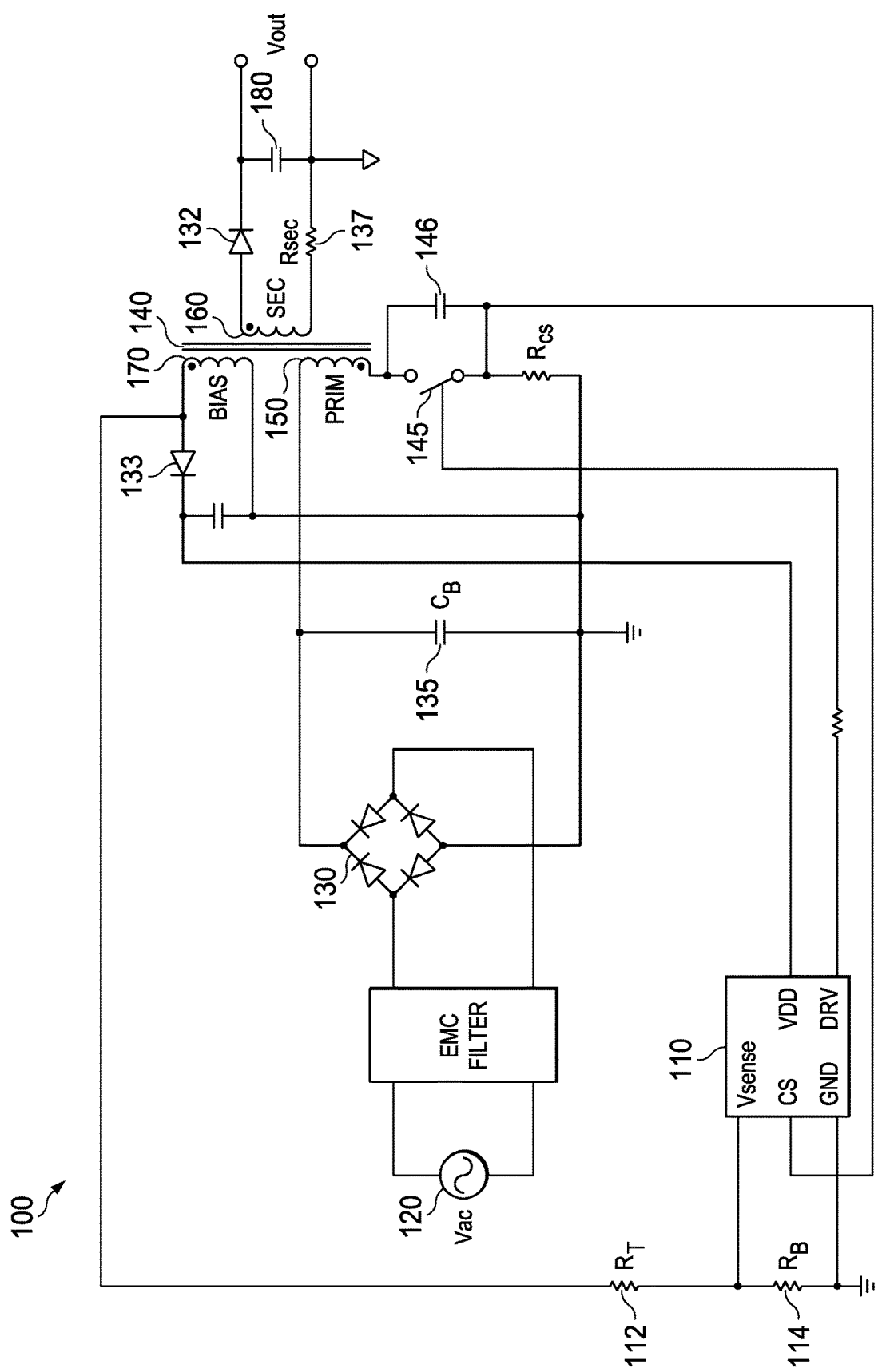
FIG. 1 is a circuit diagram of an example embodiment of a flyback voltage converter.
Figure 2A:
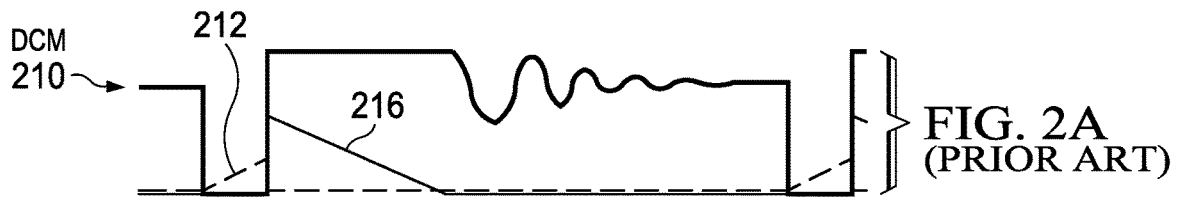
FIG. 2A is a signal diagram of a circuit in discontinuous conduction mode.
Figure 2B:
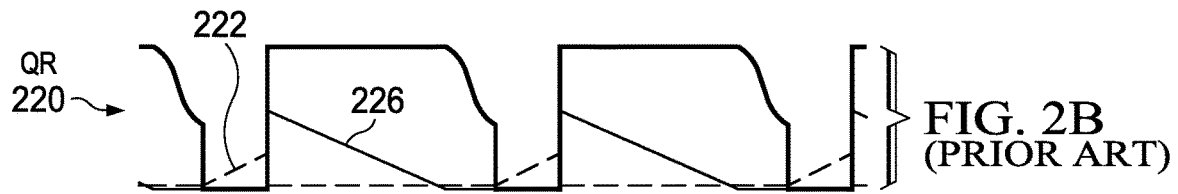
FIG. 2B is a signal diagram of a circuit in quasi-resonant mode.
Figure 2C:
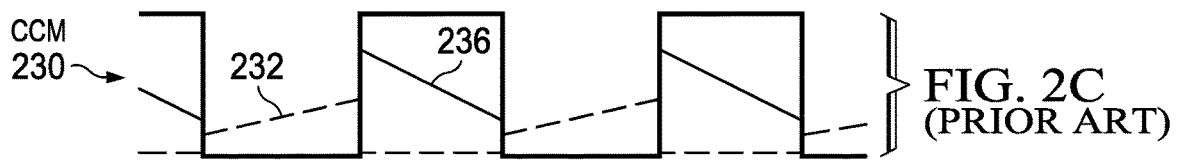
FIG. 2C is a signal diagram of a circuit in continuous conduction mode.

Referring back to FIG. 1, in example embodiments, flyback controller device 110 comprises a mixture of hardware and firmware. The firmware may be used to configure some of the hardware blocks. The firmware may also be used for mathematical processing. A voltage sense pin connects to the sense point of the flyback. During the flyback interval, the voltage on the sense winding is a scaled replica of the output voltage.

Figure 6:
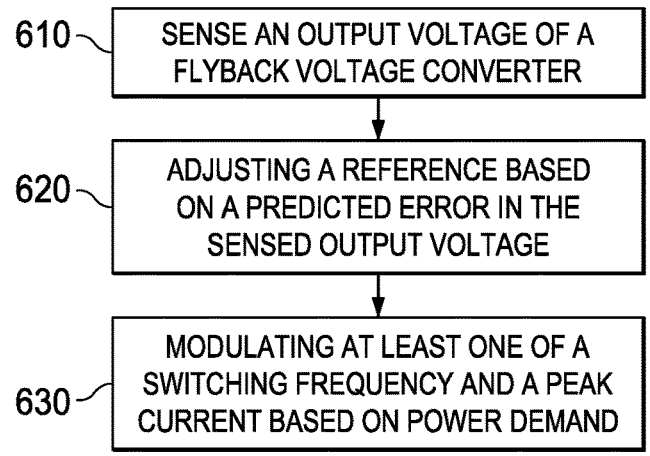
FIG. 6 is a flow diagram of an example embodiment of a method of CCM primary-side regulation.

FIG. 6 provides a flow chart of an example embodiment of a method of CCM primary-side regulation. In block 610, an output voltage of a flyback voltage converter is sensed. In block 620, a reference is adjusted based on a predicted error in the sensed output voltage. In block 630, at least one of a switching frequency and a peak current is modulated based on power demand.

Figure 7:
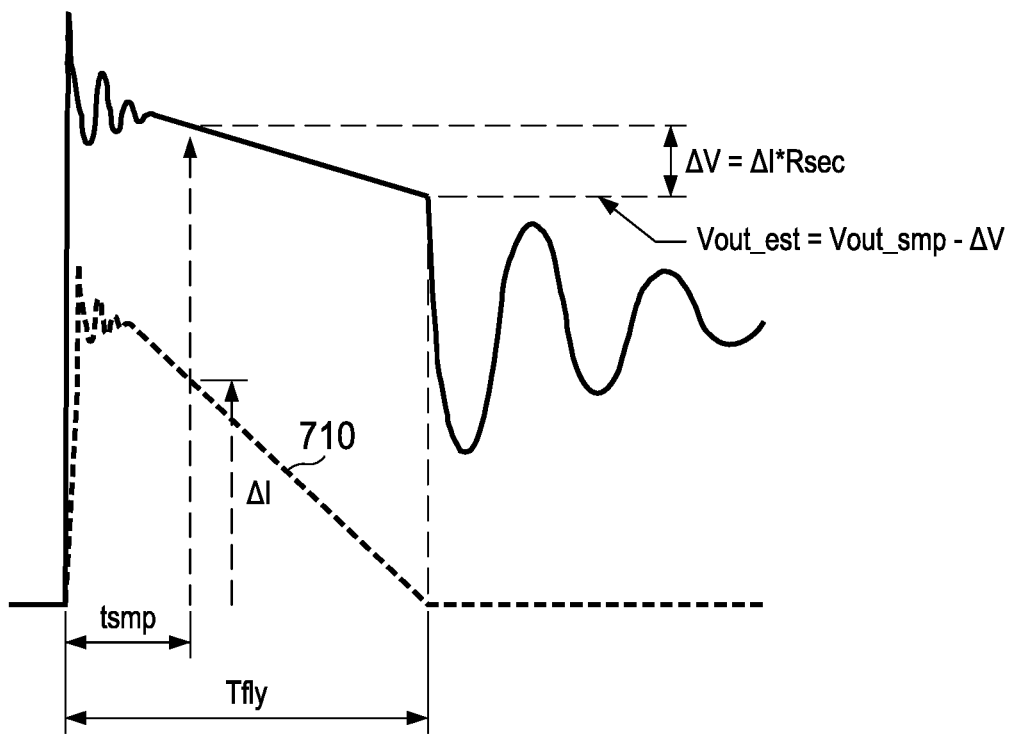
FIG. 7 is a signal diagram of an example embodiment of the flyback output sensing adjust scheme in DCM of FIG. 6.

Referring to FIG. 7, the voltage is sensed during the flyback interval at t_out-smp. The output voltage is sampled onto a sample and hold circuit. This sampled voltage represents Vout. This Vout is compared to an internal reference in an error amplifier which may be performed in a firmware block. In an example embodiment, a firmware set point and a firmware subtraction produce an error in a sampled output voltage against a target regulation set point. The error signal is then sent to a digital firmware voltage compensator to produce a controlled demand signal. This calculation produces a demand for the modulator. The demand will go up or down as required as the load and line change to keep the output in regulation.

Figure 8:
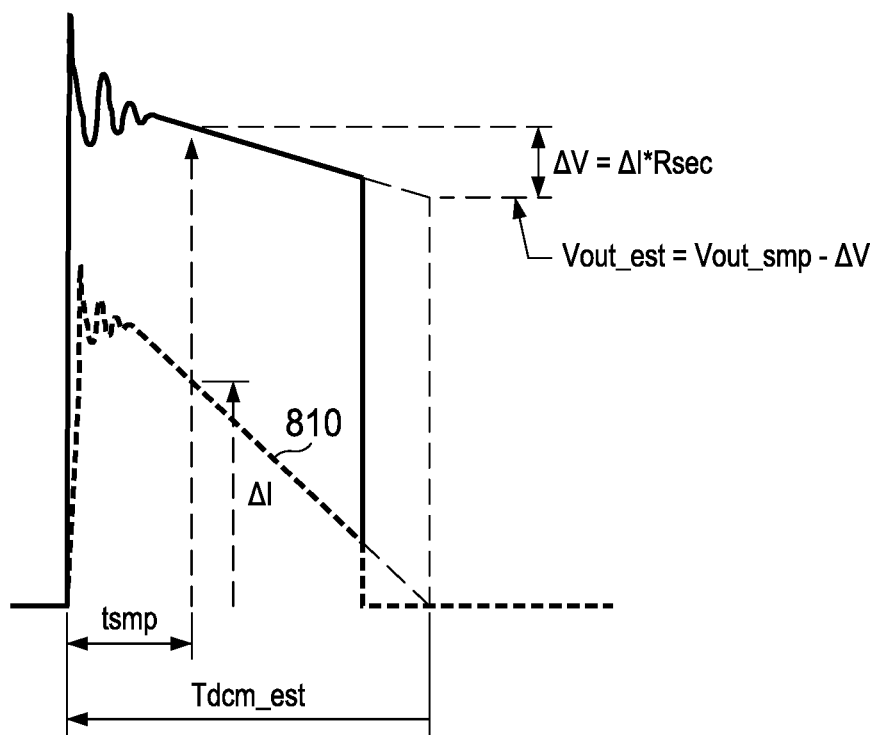
FIG. 8 is a signal diagram of an example embodiment of the flyback output sensing adjust scheme in CCM of FIG. 6.

FIG. 7 provides a graph of a flyback circuit in discontinuous mode where 710 is the current in the secondary winding 160 of the flyback transformer 140. This is shown for DCM operation, where the secondary current decays all the way to zero. FIG. 8 810 provides a graph of a flyback circuit in continuous mode. In CCM, the secondary current does not decay all the way to zero before the beginning of the next primary on time interval. By determining the primary side current, the resistive drop can estimated. By subtracting that resistive drop, the operation of the flyback circuit can be effectively extrapolated to the knee point that would have occurred. In discontinuous mode, the voltage may be sampled at a fixed point early in the flyback interval when there is current flowing. Since the current is known, and the resistance is estimated, the error may be calculated. If the error is subtracted, the same net effect is achieved as would be achieved in a knee point sampling scheme.

When Vout_smp substantially matches the reference, the demand signal is in steady state. But in reality, over time, the input voltage to the flyback stage is not a fixed voltage because it is peak rectified AC onto a capacitor. That capacitor will have a ripple voltage and the loop constantly adjusts its operating point to keep the output in regulation. It rejects the output ripple and at the same time, when the load changes, seeks to keep the output voltage constant in response to load changes.

Figure 9:
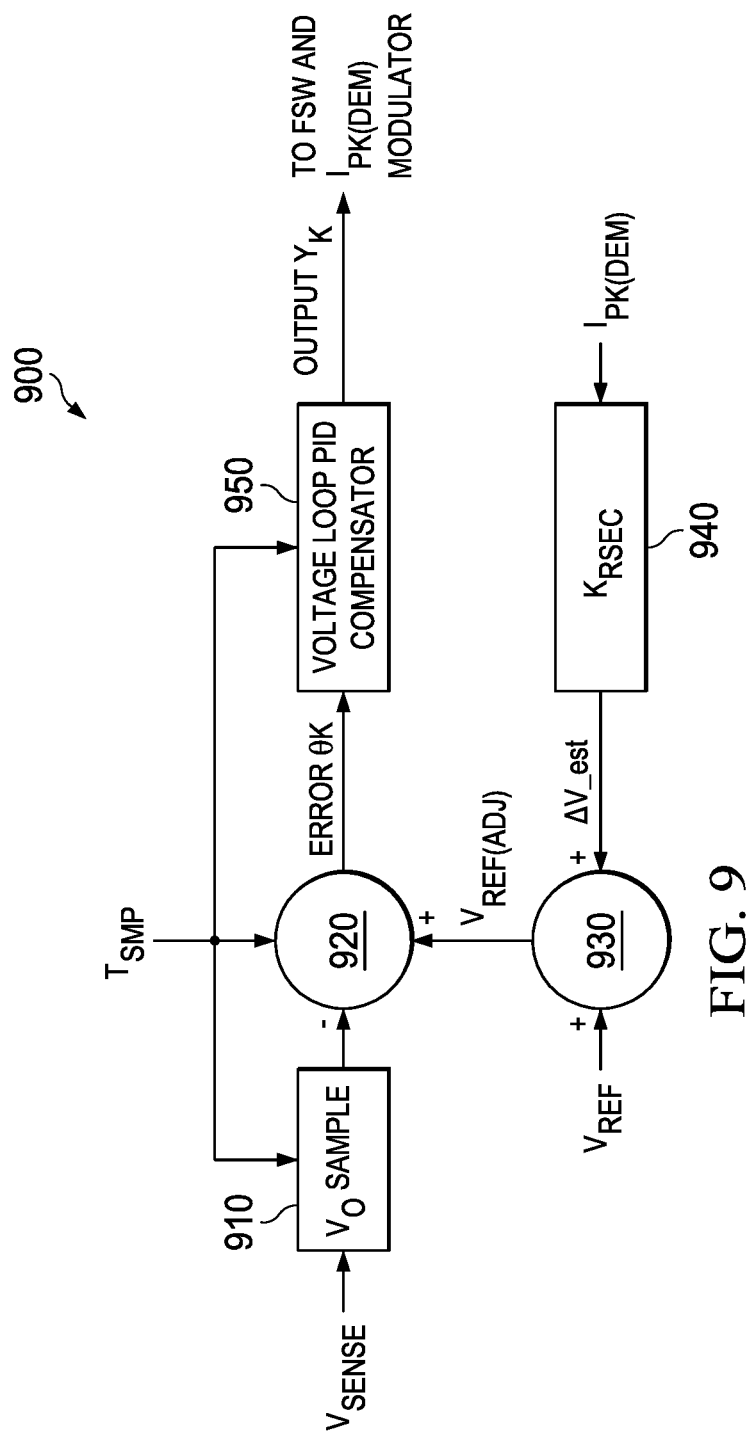
FIG. 9 is a circuit diagram of an example embodiment of the system of CCM primary-side regulation.

Referring to FIG. 9, 900 is an example embodiment of a controller (control loop) that implements the regulation improvement method of the present application. The sampled output voltage is measured at the VSENSE pin of the controller 110 and shown as 910, 920 is a different block where the error signal is determined as the difference between the measured output voltage and the adjusted reference voltage. 930 is a summing block where the adjusted reference voltage is generated as the sum of the fixed reference plus an estimate of the expected error in the output voltage as a function of the commanded peak current. 940 is the block that determines the relationship between the commanded peak current and the estimated voltage error and implements the functions described in equations (1)-(4). The demand signal from compensator 950 may be equated to a variable analog signal in the range of minimum demand to maximum demand. Depending on where it is in the range, compensator 950 programs the frequency and the peak current in the flyback stage to maintain regulation. The output of compensator 950 is sent to the Ipk modulator. The modulator is a firmware block which uses a mixture of lookup table and calculations to receive a demand signal from compensator 950 and convert to produce a required switching frequency and required peak current. Depending on the position in the operating range, the switching frequency or peak current is varied.

In response to the output voltage sample, and in response to the loop demand, a switching frequency and peak current demand is enforced on the power stage. This peak current demand is a calculated peak, so the peak current of the next cycle is known in advance. In example embodiments, the peak current demand is connected to a PWM comparator. The control loop sets the peak current demand in response to load and line changes to maintain regulation. When the peak current is reached, the PWM comparator flips and the cycle is terminated. In example embodiments, the peak current demand is digitally generated in firmware and creates an analog voltage with a digital to analog converter at the PWM comparators. A current control loop may still be maintained in analog high-speed circuitry.

A peak current may be programmed before the turn off of the MOSFET. Then with the known turns and the known secondary peak, the sensed output voltage may be adjusted. By setting the peak current for the modulator, the secondary current is known in advance and the IR drop in the secondary can be compensated. As a basic example (but any values can be used), the input current in the primary is 1 A and the turns ratio between the primary/secondary is 5:1, then the secondary current is 5 A. Moreover, it is known that the current will decay by half an amp in the sample delay. So, the current is will be 4.5 A at the sample point. If the secondary resistance is, for example, 10 mohms, 10 mohms× 4.5 A=a 45 mV error. The error of the sampled output voltage in the next cycle is known to be 45 mV error. That 45 mV may then be subtracted from the sample. Alternatively, 45 mV may be added to the reference.

In an example embodiment, the flyback controller is set with an internal gain related to the adjustment prediction. The gain factors in the flyback controller may be fixed for a specific number of turns ratio in the transformer, a secondary winding resistance, and an aggregate of the winding gate resistance, the small signal resistance of the diode, and the ESR of the capacitor. Over a wide range of designs, even though the turns ratio, the inductance, and the sense resistor may change, the constants will be approximately the same range due to the normalization effect of using the bias winding as the sense winding. Variations in output voltage due to turns ratio across different designs will be normalized to approximately the same level, since a similar regulated bias level is used to power the controller. However, in alternative embodiments, these parameters may be tuned in the firmware for a custom design. In another alternative embodiment, a mechanism may be provided to the user such as non-limiting examples of a set resistor, a potentiometer, and a graphical user interface (GUI) to adjust these gain factors on the fly to tune the performance to match the particular power stage.

Cable compensation is a similar compensation scheme in which an adaptor or a charger, for example, is at one end of a long cable, and the device to be operated/charged is at the other end. The voltage at the end of the cable has a droop factor due to the resistance of the cable. In a cable compensation scheme, the voltage of the power supply is automatically increased linearly as load current increases, so that the voltage seen at the bottom of the cable is more or less constant. On the contrary, example embodiments of the systems and methods of CCM primary-side regulation disclosed herein adjust the reference inside the flyback controller device/circuit in order to keep the output voltage constant as load changes, but by using advanced knowledge of the peak current, the error is estimated and corrected in advance. This allows for complex non-linear peak current modulation to optimize efficiency of the power stage.

Figure 10:
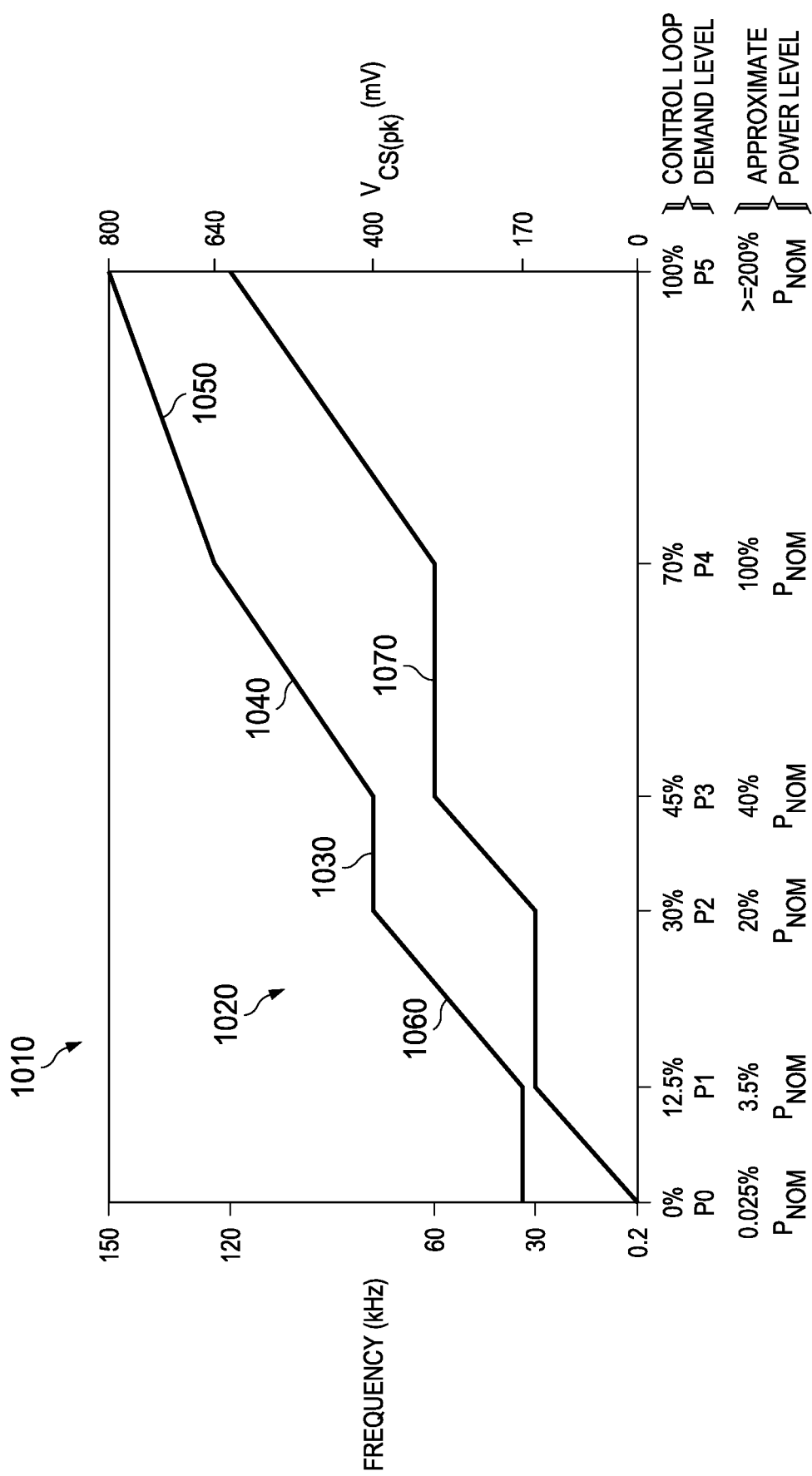
FIG. 10 is a signal diagram of an example embodiment of the modulator modes and frequency variations with power level of FIG. 9.

FIG. 10 provides a graph of example embodiments of modulator modes and switching frequency and peak current variations with power level. The flyback controller may support applications that require a wide range of operating power levels. This range may include effectively zero output power in standby conditions, up to a maximum rated continuous power, and then, beyond this, to a mode of peak operating power for a limited time. The modulator may operate in AM mode at fixed frequency, in which the amplitude of the peak current is adjusted to regulate the output. In other regions, the modulator may operate in FM mode at fixed peak current, in which the switching frequency is adjusted to regulate the output. By adjusting only peak current or switching frequency, depending on operating region, the control loop smoothly regulates the power flow of the power stage. The shape of the modulator gain curve helps counteract the increasing power stage gain as load is decreased.

In the high-power region of the modulator operation, example embodiments disclosed herein adjust both peak current and frequency together to allow higher power delivery with a modest increase in peak current. In this high-power region, the power stage may transition into continuous conduction mode (CCM), particularly at low line levels. The horizontal axis of FIG. 10 provides output power which is also relative to control loop demand level. The state of the demand signal determines the region of operation, such as regions 1010, 1020, 1030, 1040, and 1050. Signal 1060 provides the peak-current sense voltage and signal 1070 provides the switching frequency over the range of power levels. In region 1010, peak current is constant and frequency changes. In region 1020, switching frequency stays constant and peak current changes linearly. In region 1030, peak current is again constant and switching current changes linearly. In region 1040, switching again remains constant and peak current changes linearly. In region 1050, at the highest power level, switching frequency changes at the same linear rate, and peak current changes at a linear rate different from the regions 1010, 1020, 1030, and 1040. Under conditions of this highest power region, the circuit enters into continuous conduction mode in which the frequency and the peak current are simultaneously increased to achieve more power.

Signal 1060 starts flat, then becomes a linear ramp, then becomes flat, then becomes a linear ramp again, and then becomes a linear ramp with a different slope. Applying a simple technique such as cable compensation, which applies a simple linear variation of the reference with load current, would not match the more complicated curves of FIG. 10. The systems and methods of CCM primary-side regulation produces precise compensation to the actual peak current in every region of operation, and provides flat load regulation across the power range. An example embodiment of the CCM primary-side regulation disclosed herein achieves excellent regulation using two parallel loops—a current regulation loop and a voltage regulation loop.

The voltage loop compares the sensed output voltage against the reference and sends a demand signal that keeps the voltage equal to the reference. The constant-current loop measures the output current indirectly and compares it to a reference. In an example embodiment, power is measured with the current sense signal and compared to a limit in the current loop compensator. The measured power should be less than the limit power because when the circuit is not in a current limit condition, the loop sits at a voltage level that is higher than the voltage demand. The modulator then takes the lower of the two signals as an input.

If, however, the output is overloaded and current limit is reached, the measured power will attempt to exceed the limit power. Once the limit power level is reached, the current loop dominates and pulls the demand level lower than the voltage loop level in order to maintain constant input power or output current. In this case, the systems and methods disclosed herein enable a scheme of compensated voltage sample to achieve good accuracy. In cable compensation, the reference is trimmed linearly with load demand. At minimum load, the reference is set at nominal static level, and at maximum voltage it reaches the reference plus some delta. Between these levels, the reference is moved linearly, providing compensation for resistance drops in the cable to achieve a constant voltage at the end of the cable.

The flow chart of FIG. 6 shows the architecture, functionality, and operation of a possible implementation of the CCM primary side regulation software. In this regard, each block represents a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present invention has been described in detail, it should be understood that various changes, substitutions and alterations can be made thereto without departing from the spirit and scope of the invention as defined by the appended claims.

The invention claimed is:

1. A system comprising:
   a transformer having a primary winding, a secondary winding and an auxiliary winding;
   a primary side switch coupled to the primary winding; and
   a controller coupled between the auxiliary winding and the primary side switch, the controller configured to:
   sample a feedback voltage during a secondary decay period and before a secondary current of the secondary winding decayed to zero;
   determine an offset voltage based on an estimated secondary resistance and a current of the auxiliary winding when the feedback voltage is sampled;
   determine an output voltage based on a difference between the feedback voltage and the offset voltage; and
   modulate the primary switch based on the output voltage.

2. The system of claim 1, wherein the feedback voltage is sampled in continuous conduction mode.

3. The system of claim 1, wherein the controller is configured to determine the offset voltage before sampling the feedback voltage.

4. The system of claim 1, wherein the estimated secondary resistance comprises an estimated resistance of an output capacitor, an estimated resistance of an output rectifier, and an estimated resistance of the secondary winding.

5. The system of claim 1, wherein the controller comprises a memory storing instructions for modulating the primary switch using a lookup table.

6. The system of claim 1, wherein the controller is configured to sample the feedback voltage from the auxiliary winding.

7. The system of claim 1, wherein the controller is configured to sample the feedback voltage from the primary winding.

8. A method comprising:
sampling, by a primary side controller, a feedback voltage of a voltage converter during a secondary decay period and before a secondary current of a secondary winding decayed to zero;
determining, by the primary side controller, an offset voltage based on an estimated secondary resistance and a current of an auxiliary winding when the feedback voltage is sampled;
determining, by the primary side controller, an output voltage based on a difference between the feedback voltage and the offset voltage; and
modulating, by the primary side controller, at least one of a switching frequency or a peak current of a primary switch based on the output voltage.

9. The method of claim 8, wherein the sampling the feedback voltage is performed in continuous conduction mode.

10. The method of claim 8, wherein the estimated secondary resistance comprises an estimated resistance of an output capacitor, an estimated resistance of an output rectifier, and an estimated resistance of the secondary winding.

11. The method of claim 8, wherein the feedback voltage is sampled from the auxiliary winding on a flyback transformer.

12. The method of claim 8, wherein the feedback voltage is sampled from a primary winding on a flyback transformer.

13. The method of claim 8, wherein the modulating is based on a lookup table storing an association between the output voltage and the switching frequency or peak current.

14. The method of claim 8, further comprising:
estimating, by the primary side controller, the secondary resistance by adjusting a primary current from a low level to a high level for at least one switching cycle and determining a difference in successive sampled feedback voltages.

15. A primary side controller for use in a flyback converter, the primary side controller comprising:
a processor;
a memory coupled to the processor, and storing instructions, which upon being implemented by the processor, cause the processor to:
sample a feedback voltage during a secondary decay period and before a secondary current of a secondary winding decayed to zero;
determine an offset voltage based on an estimated secondary resistance and a current of an auxiliary winding when the feedback voltage is sampled;
determine an output voltage based on a difference between the feedback voltage and the offset voltage; and
adjust at least one of a switching frequency or a peak current of a primary switch based on the output voltage.

16. The primary side controller of claim 15, wherein the feedback voltage is sampled in continuous conduction mode.

17. The primary side controller of claim 15,
wherein the offset voltage is determined before the feedback voltage is sampled.

18. The primary side controller of claim 15, wherein the estimated secondary resistance comprises an estimated resistance of an output capacitor, an estimated resistance of an output rectifier, and an estimated resistance of the secondary winding.

19. The primary side controller of claim 15, wherein the feedback voltage is sampled from at least one of the primary winding or the auxiliary winding.

20. The primary side controller of claim 15, wherein the memory stores a lookup table associating the output voltage with at least one of the switching frequency or peak current.

* * * * *